(12) United States Patent
Ikeda

(10) Patent No.: US 6,187,272 B1
(45) Date of Patent: Feb. 13, 2001

(54) RECYCLING FLUIDIZATION SYSTEM

(75) Inventor: Yoneichi Ikeda, Kamakura (JP)

(73) Assignee: Nippon Mitsubishi Oil Corporation, Tokyo (JP)

( * ) Notice: Under 35 U.S.C. 154(b), the term of this patent shall be extended for 0 days.

(21) Appl. No.: 09/041,320

(22) Filed: Mar. 12, 1998

(30) Foreign Application Priority Data

Mar. 13, 1997 (JP) .................................................. 9-079009

(51) Int. Cl.⁷ .............................. B01J 8/18; C10B 47/24; C10B 49/10; C10B 49/22; C10B 55/10
(52) U.S. Cl. ............................ 422/141; 422/139; 201/31
(58) Field of Search ...................... 422/141–147, 422/139, 140; 34/576, 589; 96/123, 150; 201/31

(56) References Cited

U.S. PATENT DOCUMENTS

| 4,010,003 | * | 3/1977 | Pulak | 422/144 |
| 4,385,985 | | 5/1983 | Gross et al. | 208/113 |
| 5,158,919 | * | 10/1992 | Haddad et al. | 502/44 |
| 5,455,010 | * | 10/1995 | Lomas et al. | 422/144 |
| 5,462,652 | | 10/1995 | Wegerer | 208/167 |

FOREIGN PATENT DOCUMENTS

| 2523325 | 1/1988 | (JP) . |
| 4-261494 | 9/1992 | (JP) . |

* cited by examiner

Primary Examiner—Shrive Beck
Assistant Examiner—Alexa A. Doroshenk
(74) Attorney, Agent, or Firm—Akin, Gump, Strauss, Hauer & Feld, L.L.P.

(57) ABSTRACT

A system is disclosed for recycling a powdery solid material used as a catalyst or a heat medium. The system simple in structure compared with a conventional system does not need to use a gas for transporting the solid and can readily maintain the pressure balance to recycle the solids smoothly in a stable manner.

5 Claims, 1 Drawing Sheet

RECYCLING FLUIDIZATION SYSTEM

BACKGROUND OF THE INVENTION

1. Field of the Invention

This invention relates to a recycling fluidization system more particularly to a system in which a gaseous material is subjected to the desired reaction in a downflow type reactor using a finely divided solid material such as a catalyst and a heat medium which recycles through the system.

2. Prior Art

There are known a reaction system in which a solid particle as a catalyst or heat medium is brought into contact with a reactant. A fluidized bed type reactor is a typical example of such reaction system which reactor is classified into one utilizing a dense-phase fluid bed (bubbles-fluid bed) and the other utilizing a high-velocity moving bed. The high-velocity moving fluid bed is used for a reaction in which a solid and gas must come into contact for a short period of time. Currently, there has been mainly employed an upward flow-type high velocity moving bed reactor called "riser" in a fluid catalytic cracking apparatus used for the production of gasoline from a feedstock such as a heavy oil. This reactor is capable of reducing contact time due to an improvement of a catalyst in ability, leading to an enhancement of selectivity of a final product and depression of excessive secondary cracking reaction.

However, a riser-type apparatus accompanies a problem so-called "backmixing" which is a phenomenon that a part of a gaseous material or a solid material flows the reverse direction of the main stream due to gravity acting downwardly on an upwardflow mixture. If such a backmixing of a gaseous material takes place, a part of the gaseous material is removed from a reactor after being reacted incompletely resulting from extremely short contact time and the other part of the gaseous material develops a reaction such as excess cracking due to prolonged contact time, leading to a deterioration of a reaction product. A backmixing of a solid material leads to a reduction of reaction efficiency resulting from a part of the solid material in a deteriorated condition remaining in a reactor for a long period of time.

Recently, in order to evade this problem there has been used a downflow-type reactor as disclosed in Japanese Laid-Open Patent Publication No. 4-261494, U.S. Pat. Nos. 5,462,652 and 4,385,985 and Japanese Patent No. 2,524,425 all of which are intended to shorten contact time and avoid the occurrence of back flow of a gaseous or solid material so as to improve selectivity of the reaction product. However, still some problems are Involved when consideration given to these prior art techniques as a whole a recycling fluidized bed system in which reaction and regeneration are carried out consecutively. More specifically, these prior art techniques can not obtain satisfactory results in view of returning a solid material falling through a downflow reactor to the upstream position where it was in an effective manner for regenerating the solid material to use it again for the reaction.

For instance, it is proposed in Japanese Laid-Open Paten Publication No. 4-261494 to lift up a regenerated catalyst to the inlet of a reactor with a gas used for transportation purposes. However, in this system a blower requires to be increased in capability excessively due to the necessity of using a gas as a medium for lifting up a catalyst other than a combustion gas for regenerating a catalyst, leading to an apparatus complicated in structure which is not preferable in economical point of view. U.S. Pat. No. 5,462,652 has also the same drawback.

U.S. Pat. No, 4,385,985 discloses as to lift up a catalyst using a gas for combustion in a upflow type regenerator. However, the disclosure of this U.S. patent found to be difficult in practical usage with the following reasons. Namely, this prior art is silent as to that pressure loss occurs, compensating for work load in lifting up a catalyst and as a result of this, pressure is increased at the inlet for introducing the air for regeneration, which pressure must be suppressed by static pressure of a dense-phase catalyst bed formed in a stripping device. The pressure at the inlet increased larger than the static pressure of the dense-phase catalyst bed would result in failure of recycling of a catalyst due to backflow of the combustion air toward the stripping device In order to solve this problem there may be made an attempt to increase the height of the dense-phase bed in the stripping device to increase the static pressure at the stripping device rather than at the inlet. However, this attempt ends in fallure because the distance of lifting up the catalyst must be increased, resulting in an increase of pressure loss involved with lift up of the catalyst. Alternatively, an attempt of increasing the pressure at the stripping device would lead to an increase of pressure of the upper portion of the regenerator which is connected via the reactor with the stripping device. Therefore, the pressure is also increased at the inlet for introducing the air provided on the lower portion of the regenerator. Furthermore, if the blowing rate of combustion air to be used is increased, the catalyst in the regenerator Is decreased in density and pressure loss is also reduced. However, this alternative is economically feasible because the total amount of the air is increased. The above-mentioned Japanese Patent has the same drawback because it proposes to lift up a catalyst to the inlet of a reactor by introducing the recycling air from the lower part of the regenerator.

As described above, it is rather difficult to maintain the pressure balance in a recycling in which solids circulate in a sequence of a reactor, a stripping device, a regenerator and again the reactor while minimizing the amount of the air to be used in a recycling fluid bed reaction system using a downflow reactor. It is more difficult to maintain such a pressure balance in an apparatus in which the recycle ratio of a solid material is large because it requires a large power source to lift up solids.

In a process aiming for improving selectivity of a reaction product for a short contact period, the reaction tends to be effected at a high mixture ratio to maintain a high conversion ratio with contact time kept as short as possible. From view of this background, there has been demanded a system comprising some fluidized or moving bed elements connected in a series which system is simple In structure requiring no air for conveying a solid material and can readily maintain pressure balance to recycle a solid material smoothly. The term "fluidized bed element" used herein designates a series of independent vessel-shape elements constituting a reaction system or apparatus through which a reaction material and the transportation gas for conveying flows consecutively in one direction.

SUMMARY OF THE INVENTION

With the foregoing difficulties of the prior art in view, the present invention seeks to provide a recycling fluidized bed system which is simple in structure with no necessity of using the additional transportation gas over the total amount of regeneration air and can maintain a pressure balance to recycle a solid material smoothly.

According to the invention, there is provided a system for recycling a powdery solid material used as a catalyst or a heat medium which comprises in combination: a downflow moving bed forming element the upper part of which the solid material is supplied; a first dense-phase fluidized bed forming element connected with the lower portion of the downflow moving bed forming element: a second dense-phase fluidized bed forming element having an inlet to which the solid material is introduced through a feed rate adjusting element, in the portion where the pressure distribution is low and an upflow type-moving bed forming element having a lower end connected with and extending longitudinally from the upper end of the second dense-phase fluidized bed forming element, and supplying the solid material through a second feed rate adjusting element into the down flow moving bed forming element, the density of the solid material in said first dense-phase fluidized bed forming element being maintained only 0.4–0.8 g/cm$^3$ higher than that in the upflow type-moving bed forming element.

According to another aspect of the invention, there is provided a system which comprises in combination: a downflow moving bed forming element the upper part of which the solid material is supplied; a first dense-phase fluidized bed forming element connected with the lower portion of the downflow moving bed forming element; a second dense-phase fluidized bed forming element having an inlet to which said solid material is introduced through a standpipe and a first feed rate adjusting element in the portion where the pressure distribution is high and an upflow type-moving bed forming element having a lower end connected with and extending longitudinally from the upper end of the second dense-phase fluidized bed forming element, and supplying the solid material through a second feed rate adjusting element into the downflow moving bed forming element, the density of said solid material in said first dense-phase fluidized bed forming element being maintained only 0.4–0.8 g/cm$^3$ higher than that in said upflow type-moving bed forming element.

In the inventive system (apparatus), a first dense-phase fluidized bed element such as a stripping device is arranged below a downflow type moving element such as a reactor. By the combination of a second fluidization element forming a regeneration section and an upflow type moving bed element such as a high-and medium-velocity fluid bed connected with the upper part of the regeneration zone, a gas such as air in the system is used as a medium for lifting up a solid material. With such a manner, a solid material can be lifted up to the upstream of the system with a small pressure loss. Furthermore, a solid material is introduced from the first element into the second element through the upper portion thereof, not through the lower portion where pressure is increased by the static pressure of the solid material.

Alternatively, the inventive system may be modified such that the a solid material is introduced to the lower portion of the second element where the pressure is high, by forming a standpipe connected at one end to the lower portion of the second element with the use of the static pressure of the solids in the standpipe. Whereby it is possible to establish and maintain the recycle of a solid material, keeping a pressure balance with a simplified flow mechanism without increasing the size of the whole system and supplying the extra amount of air for lifting up the solid material.

The above and other features and advantages of the invention will be better understood from reading the following detailed description with reference to the accompanying drawing.

DETAILED DESCRIPTION OF THE INVENTION

Figure 1:
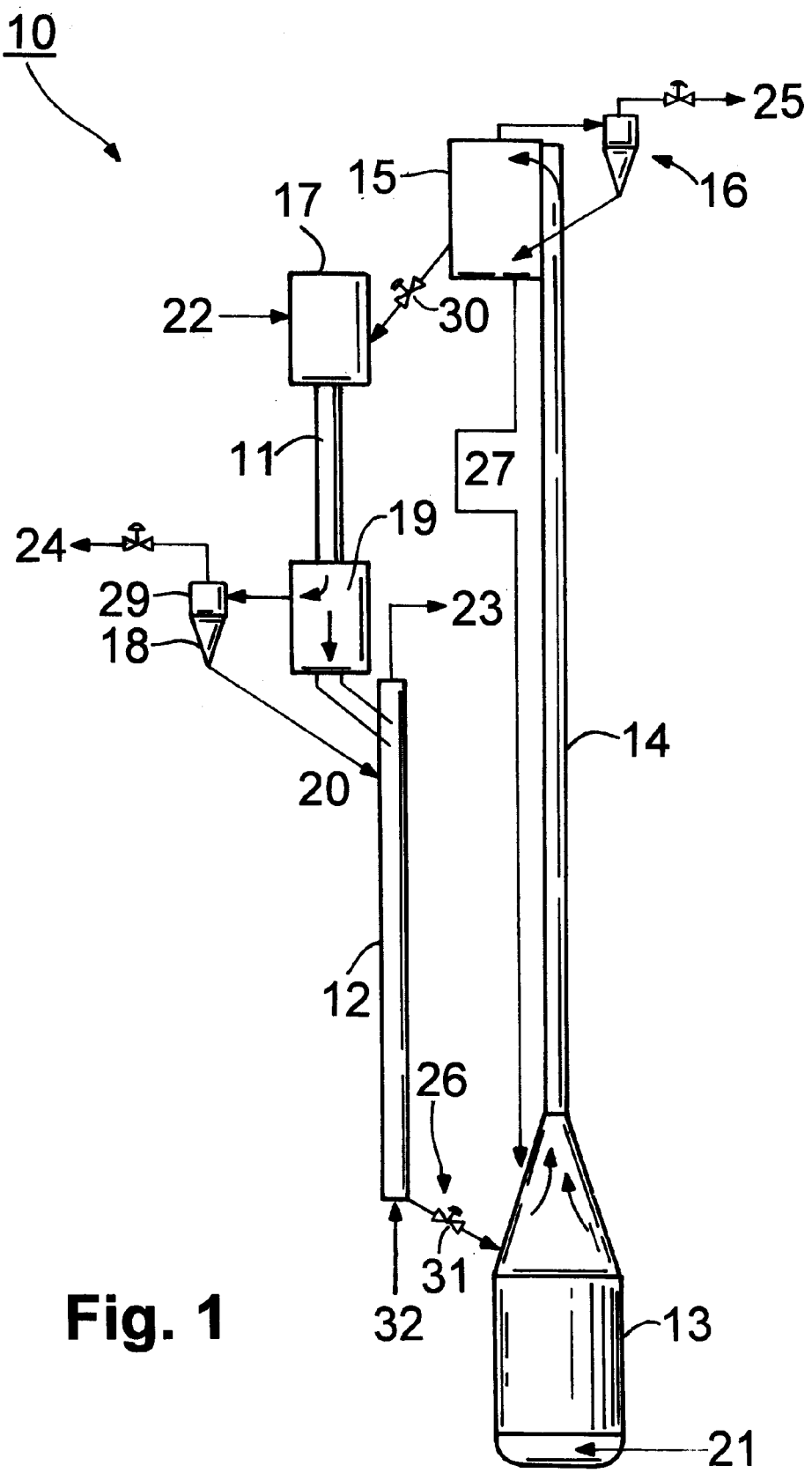
FIG. 1 is a block diagram showing one embodiment of the invention.

Referring now to FIG. 1, there is shown a typical example of a system 10 according to the invention. In this system, the cracking reaction of a hydrocarbon oil such as heavy oil is carried out using a powdery solid material used as a catalyst for catalytic cracking such as silica alumina supplied from the upstream to a known vertical downflow type reactor forming a high velocity moving bed constituting a downflow type moving bed element. The reaction product is separated in a separator 19 connected with the reactor 11 and removed through a line 23 from the system 10, The powdery solid catalyst recycles in the system In the sequence of the vertical downflow type high velocity moving bed reactor 11 and a stripper 12 (a first dense-phase fluidized bed forming element), a dense-phase fluidized bed type regenerator 13 (a second dense-phase fluidized bed forming element), a high- and medium-velocity moving bed type upflow regenerator 14 (an upflow moving bed forming element) referred to as a riser regenerator, a feed hopper 15 and the reactor 11 again. Generally, a gas to be a pressure source including hydrocarbon gas pressurized by means of a pump. a hydrocarbon oil to be vaporized by the contact with a solid material or a gas such as a steam generated by a boiler and an inert gas such as nitrogen pressurized by a compressor to the reactor 11 is introduced to the reactor 11 or the other component constituting the first element In the inventive system, feed stocks such as a hydrocarbon is supplied through a line 22 to an injector. The feedstock is in the form of a gas or a liquid. If the feedstock is a liquid, it is vaporized by the injector 17 when mixed with a solid material.

The high-velocity separator 19 arranged below and connected with the reactor 11 is supplied with the reaction product which is the mixture of the hydrocarbon gas and the powder solid catalyst. After most of the solids are removed from the mixture in the separator 19, the resulting gas is transferred to a secondary separator 18 where the gas is taken out from the system through a line 24 after removal of the small amount of solids remaining in the gas. The gas is then directed to a system for recovering a reaction product including a distillation column The secondary separator 18 is preferably a tangential cyclone. Alternatively, in the case where contact time Is required to be shorten, the separator 19 may be omitted and the mixture of the solids and the gaseous reaction product may be directly introduced to the tangential cyclone. The solids removed from the mixture in the separator are directed through a dipleg 20 to the stripper 12.

The solids transported to the stripper 12 are formed into a dense-phase bed and then the hydrocarbon remaining over or between the solids are removed with an inert gas such as a steam introduced from a line 32 In this way, the stripper 12 and the other component of the first element are supplied with a gas which can be a source of pressure such as a steam generated from a boiler, an inert gas of nitrogen pressurized by a compressor. In the inventive system, the above-mentioned hydrocarbon is guided through a line 23 to a recovery system (not shown) together with an inert gas such as a steam.

The solids taken out from the lower portion of the stripper 12 are introduced to the regenerator 13 through a valve means 31 constituting a first flow-rate adjusting element The line 26 is connected with the upper half region of the regenerator 13 where the pressure therein variable by distributive gradient is sufficiently decreased, not with the lower region where the pressure is increased by the static pressure of the solids so as to make possible the introduction of the solids from the stripper 12 is made available. The precise position in the upper region to be connected is determined by the formula of $P \leq (P_T + P_a)/2$ wherein P is the pressure at the region where the solids are introduced, $P_T$ is the pressure at the top of the regenerator 13 and $P_a$ is the pressure at the bottom of the regenerator 13. Since the interior of the dense-phase bed is taken to be a complete mixed bed, the regeneration efficiency of solids is not reduced even though the line 26 is connected to the upper half region of the regenerator 13. A portion of the line 26 may be replaced with a standpipe to change the connection position to the regenerator 13 in a manner hereinafter described in detail In the regenerator 13, the solids contact the regeneration air supplied from the line 21 and then the regeneration of solids is effected by subjecting the carbonaceous material deposited on the solids or the undecomposed hydrocarbon oil removed incompletely in the stripper to combustion In such a manner, generally the regenerator and the other component constituting the second dense-phase fluidized bed forming element are supplied with a gas to be a pressure source such as the air pressurized by a compressor, a hydrocarbon gas pressurized by a means of a pump and a hydrocarbon oil a part of which is to be vaporized by the contact with the solids.

The upper portion of the regenerator 13 is connected with the riser-type regenerator 14 (upflow regenerator) in which a high-and medium-velocity dilute-phase fluidized bed is formed. All of the solids and the regenerating air fed into the regenerator 13 are introduced to the riser regenerator 14 which has a smaller diameter than that of the regenerator 13.

In the riser regenerator 14, the solids and the air are formed into a high-or medium-velocity moving bed As a result of this, the solids are reduced in density and the air is reduced in static pressure. Therefore, it becomes possible to lift up the solids to the upstream of the system (apparatus).

By connecting the upper portion of the regenerator 13 in a conical shape with the riser regenerator 14, the regeneration air can be used as a lift up air. Therefore, as it is not necessary to supply the air for lifting up the solids, the air feed means such as blower can be minimized in terms of capability and thus the apparatus can be simplified in structure, leading to easy operation and an advantage in economical view.

In the case where oxygen in the combustion air is completely spent in the regenerator 13, the air in the riser regenerator is used merely as medium for transporting the solids. If oxygen in the combustion air is incompletely spent, the air is used for combustion in the riser regenerator 14 and also functions as a medium for transportation of the solids. In order to facilitate the combustion, the regeneration air may be supplied into the inlet of the riser regenerator. The solids may be recycled from the feed hopper 15 throughout the line 27 to the regenerator 13.

Generally speaking, in a system (apparatus) using a downflow type reactor, it is indispensable to lift up solids falling onto the lower part of the reactor to the upstream of the system. In view of this, the inventive system is advantageous in the economical because it makes possible the upward transportation rationally.

The solids lifted up from the upper portion of the riser regenerator are stored temporarily in the feed hopper 15 and then introduced into the injector 17 to be mixed with the hydrocarbon feedstock supplied through the line 22 again and reacted in the reactor 11, whereas the regeneration air-passes through the separator means 16 and is discharged from the system through the line 25. The feed hopper 15 may be omitted from the system if it is possible to avoid the leakage of the air travelling from the riser regenerator 14 to the injector 17 with the valve and standpipe combination.

When taking look at the whole system described above, the pressure balance thereof decreases gradually, starting from the lower outlet of the stripper 12 to the inlet thereof in a counterclockwise direction of FIG. 1. The reason for the decrease is that the pressure loss occurs at the valve 31 of the first feed rate adjusting element, the riser regenerator 14, the valve 30 of the second feed rate adjusting element, the injector 17, the reactor 11 and the high-velocity separator means 29. In such a pressure loss condition, the pressure at the upper portion of the first element is higher than that of the lower portion of the first element, i.e. the pressure increases in the flow direction, resulting in failure of establishment of recycling of the solids. The problem caused by this difference in pressure in the flow direction is overcome by the static pressure of the dense-phase fluidized bed of the solids formed in the first element 12. Therefore, the solids can not be recycled under the conditions that the pressure loss developed at the dense-phase fluidized type regenerator through the separator increases and becomes higher than the static pressure of the solids in the first element.

The conditions under which the recycle of solids is established in the above-mentioned system is represented by the formula $$Hs \times \rho s/10 > Hr \times \rho r/10 + \Delta Pb \times 2 + \Delta P' \qquad (I)$$

wherein Hs is the height (m) of a dense-phase fluidized bed formed in the stripper 12, $\rho s$ is the density (g/cm$^3$)of a dense-phase fluidized bed formed in the stripper 12, Hr is the height (m) of a fluidized bed formed in the riser regenerator 14, $\rho r$ is the density (g/cm$^3$) of a fluidized bed formed in the riser regenerator 14, $\Delta Pb$ is the pressure loss (kg/cm$^2$) at the valves 30 and 31 and $\Delta P'$ is the pressure loss at the other part of the system.

As apparent from FIG. 1, if Hs is large, Hr is also increased. The relationship between Hs and Hr is represented by the formula $Hr = Hs + \Delta H$ . . . (II). In this formula, $\Delta H$ represents the height of the downflow moving bed forming element including the reactor 11 and thus can not be freely determined when it comes to the design of a system. Formula (I) can be represented using formula (II) as follows:

$$Hs(\rho s - \rho r) < \rho r \times \Delta H + \Delta Pb \times 2 + \Delta P' \qquad (III).$$

$\Delta Pb$ is determined by the performance of the valves generally ranging from 0.1 to 0.5 kg/cm$^2$ and has limited selectivity for designing the system. $\Delta P'$ ranges from 0.1 to 0.3 kg/cm$^2$ and thus has also limited selectivity.

After all, as $(\rho s - \rho r)$ decreases, Hs increase which means that the system increases in height, leading to an increase In construction costs of the system.

In the examples of the invention given below, $\rho s$ is maximized and $\rho r$ is minimized so that the system can be optimally designed with Hs reduced as much as possible. By maintaining the solid density in the first dense-phase fluidized forming element at only 0.4 to 0.8 g/cm$^3$ higher than that in the riser regenerator 14, the desired $\rho s$ and $\rho r$ values are obtained.

The system intended by the invention can be obtained with another similar structure to that of the above-described system. In a system which is substantially the same as the system shown in FIG. 1, a part of the line 26 is replaced with a standpipe, the line 26 can be connected with the lower half portion of the regenerator 13. The term "standpipe" used herein designates a pipe section disposed vertically or at inclination angle within 45° with respect to a vertical direction and filled with solids. The standpipe is supplied with gas held to minimum to be needed for fluidization or is maximized in density of the solids without feeding the gas at all, The pressure in the lower portion of the line 26 can be increased with the static pressure within the standpipe which is higher than the half height of the regenerator 13. Therefore, in the case of introducing solids into the lower half portion of the regenerator. it is still possible to maintain the recycle of solids in a stable manner and obtain the effect which is equivalent to that obtained by the system shown in FIG. 1.

The invention will be further described with the results of the experiments using the examples embodying the inventive system.

Experiment 1

There were used a solid having a bulk density of 0.85 g/cm³ as a fluidized catalytic cracking catalyst and the system equivalent to that shown in FIG. 1 The dense-phase fluidized bed in the stripper 12 was 9 m In height. The lineal speed of steam for stripping was 0.1 m/s. The regenerator 13 was 1 m in height. The lineal speed of the combustion air in the regenerator 13 was 0.6 m/s. The riser regenerator 14 was 3 m in height. The lineal speed of the combustion air in the riser regenerator 14 was 3.6 m/rs. Under these conditions, the stable catalyst recycle was established.

The density of the catalyst each in the stripper 12, the regenerator 13 and the riser regenerator was 0.77 g/cm³, 0.53 g/cm³ and 0.07 g/cm³, respectively. The pressure loss at the valves 30 and 31 was 0.1 kg/m². The line 26 was connected with the regenerator 13 at the position 0.2 m below from the upper end thereof.

Experiment 2

The procedure of Experiment 1 was followed except that the line 26 was connected with the regenerator at the position 0.8 m below the upper end thereof and in corresponding to this the line 26 was also connected with the regenerator by a part of the line 26 having a length of 0.5 from the valve 31 in a downstream and formed into a vertical standpipe. As well as Experiment 1, the stable catalyst recycle was established.

Comparative Experiment 1

When the procedure of Experiment 1 was followed except that the gas for stripping was varied In a superficial velocity in a column to 0,8 m/s, the static pressure in the stripper 12 was reduced and the differential pressure at the valves 20 and 21 was reduced. As a result of this. the recycle of the catalyst was ceased.

Comparative Experiment 2

When under the same operation conditions as those of Experiment 1, the gas in the riser regenerator 14 was varied in a superficial velocity in a column to 0.9 m/s, the pressure loss in the riser regenerator 14 was increased. As a result of this, the recycling of the catalyst was ceased.

Comparative Experiment 3

When under the same operation conditions as those of Experiment 1, the gas in the stripper 12 was varied in a superficial velocity In a column to 0.01 m/s, the stripping efficiency was reduced and the yield of the reaction product was reduced. Furthermore, heat generation in the generator was increased, leading to failure of controlling temperature in the reactor 11.

As described above, in the inventive system, solids can be lifted up to the upper part of an apparatus with a small pressure loss because of the arrangement of a stripper below a downflow reactor, the increased static pressure of the dense-phase fluidized bed formed In the stripper, the utilization of the regeneration air for lifting up the solids which is made possible by the combination of a regenerator forming a dense-phase moving bed and an upflow regenerator forming a high-and medium-velocity moving bed and connected to the upper portion of the dense-phase fluidized bed regenerator. Furthermore, in the inventive system the solid catalyst Is introduced from the stripping device to the upper portion of the dense-phase fluidized bed regenerator, not to the lower part thereof where the pressure therein is increased by the static pressure of the solids. Therefore, the stable recycling of solids can be established by balancing the pressure in the system without feeding a gas for transporting the solids and increasing the size of the apparatus because of the simplified flow formation.

Alternatively, by modifying a part of the introduction means which introducing the solids from the stripping device to the regenerator, into a standpipe, the solids can be introduced into the lower part of the dense-phase fluidized bed regenerator where pressure is high, with the use of the static pressure of the solids in the standpipe, resulting the same effect.

What is claimed is:

1. A system for recycling a powdery solid material used as a catalyst or a heat medium which comprises in combination: a downflow moving bed forming element having an upper part to which said solid material is supplied; a first dense phase fluidized bed forming element connected with a lower portion of said downflow moving bed forming element; a second dense-phase fluidized bed forming element having an inlet to which said solid material is introduced through a feed rate adjusting element in an upper half portion of the second dense-phase fluidized bed forming element where a pressure distribution is low and an upflow moving bed forming element having a lower end connected with and extending longitudinally from an upper end of said second dense-phase fluidized bed forming element, and a second feed rate adjusting element in communication with the upflow moving bed forming element through which said solid material is supplied into said downflow moving bed forming element, wherein the system is capable of maintaining a density of said solid material in said first dense-phase fluidized bed forming element of only 0.4–0.8 g/cm³ higher than that in said upflow fluidized bed forming element to recycle said solids.

2. The system according to claim 1 wherein said downflow moving bed forming element includes a vertically-oriented downflow high velocity moving bed reactor.

3. The system according to claim 1 wherein said first dense-phase fluidized bed forming element includes a stripping device.

4. The system according to claim 1 wherein said second dense-phase fluidized bed forming element includes a dense-phase fluidized bed reactor.

5. The system according to claim 1 wherein said upflow moving bed forming element includes a riser regenerator.

* * * * *